United States Patent
Onuma

(10) Patent No.: US 11,986,987 B2
(45) Date of Patent: May 21, 2024

(54) INJECTION MOLDING MACHINE

(71) Applicant: Shibaura Machine Co., Ltd., Chiyoda-ku (JP)

(72) Inventor: Hiroyuki Onuma, Numazu (JP)

(73) Assignee: Shibaura Machine Co., Ltd., Chiyoda-ku (JP)

( * ) Notice: Subject to any disclaimer, the term of this patent is extended or adjusted under 35 U.S.C. 154(b) by 148 days.

(21) Appl. No.: 17/437,241

(22) PCT Filed: Mar. 6, 2020

(86) PCT No.: PCT/JP2020/009823
§ 371 (c)(1),
(2) Date: Sep. 8, 2021

(87) PCT Pub. No.: WO2020/184471
PCT Pub. Date: Sep. 17, 2020

(65) Prior Publication Data
US 2022/0168939 A1 Jun. 2, 2022

(30) Foreign Application Priority Data

Mar. 12, 2019 (JP) .................................. 2019-044940

(51) Int. Cl.
*B29C 45/76* (2006.01)
*B29C 45/04* (2006.01)
(Continued)

(52) U.S. Cl.
CPC ........ *B29C 45/768* (2013.01); *B29C 45/0441* (2013.01); *B29C 45/84* (2013.01);
(Continued)

(58) Field of Classification Search
CPC . H02P 5/00; B29C 45/66; B29C 45/84; B29C 45/768; B29C 45/0441
See application file for complete search history.

(56) References Cited

U.S. PATENT DOCUMENTS

| 5,249,119 A | 9/1993 | Kaseda et al. |
| 2007/0212093 A1 | 9/2007 | Maeda et al. |
| 2008/0317524 A1 | 12/2008 | Takahashi et al. |

FOREIGN PATENT DOCUMENTS

| DE | 10 2017 110 192 B3 | 10/2018 |
| EP | 1 790 459 A2 | 5/2007 |

(Continued)

OTHER PUBLICATIONS

English Translation of JP 2003174786 (Year: 2003).*
(Continued)

*Primary Examiner* — Alison L Hindenlang
*Assistant Examiner* — Shibin Liang
(74) *Attorney, Agent, or Firm* — Oblon, McClelland, Maier & Neustadt, L.L.P.

(57) ABSTRACT

An injection molding machine includes: a timing belt wound around a driving-side rotation member and a driven-side rotation member and configured to transmit power from the driving-side rotation member to the driven-side rotation member; a driving-side rotation detecting unit configured to detect a rotational speed of the driving-side rotation member; a driven-side rotation detecting unit configured to detect a rotational speed of the driven-side rotation member; and an abnormality detecting unit configured to detect an abnormality in the timing belt based on a relative speed difference between the rotational speed of the driving-side rotation member detected by the driving-side rotation detecting unit and the rotational speed of the driven-side rotation member detected by the driven-side rotation detecting unit in a predetermined period after the driving-side rotation member starts to rotate from a stopped state.

4 Claims, 5 Drawing Sheets

(51) Int. Cl.
 *B29C 45/84* (2006.01)
 *B29C 45/17* (2006.01)
(52) U.S. Cl.
 CPC .......... *B29C 2045/1784* (2013.01); *B29C 2945/76163* (2013.01); *B29C 2945/76254* (2013.01)

(56) References Cited

FOREIGN PATENT DOCUMENTS

| JP | 4-209930 | A |   | 7/1992 | | |
|----|----------|---|---|--------|---|---|
| JP | 4-218809 | A |   | 8/1992 | | |
| JP | 11-190405 | A |   | 7/1999 | | |
| JP | 2003-174786 | A |   | 6/2003 | | |
| JP | 2003174786 |   | * | 6/2003 | ............. | B29C 45/66 |
| JP | 2003-240074 | A |   | 8/2003 | | |
| JP | 2004-10323 | A |   | 1/2004 | | |
| JP | 2004-99252 | A |   | 4/2004 | | |
| JP | 2005-125537 | A |   | 5/2005 | | |
| JP | 2010-284931 | A |   | 12/2010 | | |
| JP | 2012-25091 | A |   | 2/2012 | | |
| JP | 2014-44410 | A |   | 3/2014 | | |
| JP | 2018-132134 | A |   | 8/2018 | | |

OTHER PUBLICATIONS

Combined Chinese Office Action and Search Report dated Sep. 30, 2022, in corresponding Chinese Patent Application No. 202080019859.0 (with English Translation and English Translation of Category of Cited Documents), 17 pages.

International Search Report dated May 19, 2020 in PCT/JP2020/009823 filed on Mar. 6, 2020, 2 pages.

Office Action dated May 17, 2022, in corresponding Japanese Patent Application No. 2019-044940 (with English Translation), 6 pages.

\* cited by examiner

INJECTION MOLDING MACHINE

CROSS-REFERENCE TO RELATED APPLICATIONS

This application is a national stage application of International Application No. PCT/JP2020/009823, filed Mar. 6, 2020, which designates the United States, incorporated herein by reference, and which claims the benefit of priority from Japanese Patent Application No. 2019-044940, filed Mar. 12, 2019, the entire contents of which are incorporated herein by reference.

TECHNICAL FIELD

The present invention relates to an injection molding machine, and specifically relates to an injection molding machine that detects an abnormality in a timing belt used for the injection molding machine.

BACKGROUND ART

An injection molding machine includes a plurality of operation units that perform various operations, and in some of the operation units, power generated by a drive unit that is used as a power source is transmitted by a timing belt. In a transmission path for the power transmitted by the timing belt, a drive shaft that transmits the power generated by the drive unit to the operation unit side, and a driven shaft that is rotated by the power transmitted from the drive shaft to cause the operation unit to work are disposed, and a timing belt is wound around the drive shaft and the driven shaft. Due to this, the power can be transmitted from the drive shaft to the driven shaft by the timing belt, and the power generated by the drive unit can be transmitted to the operation unit.

Some injection molding machines in recent years detect a state of a timing belt because the timing belt is an important member for a transmission path for power as described above. For example, in the injection molding machine disclosed in Patent Document 1, a timing belt is wound around one driven shaft from rotating shafts of a plurality of rotary drive unit, rotational positions of the respective rotary drive units are detected by encoders, and an abnormality in the timing belt is detected based on deviations in the detected rotational positions.

CITATION LIST

Patent Literature

Patent Document 1: Japanese Patent Application Laid-open No. 2012-25091

SUMMARY OF INVENTION

Problem to be Solved by the Invention

However, in a case of detecting an abnormality in the timing belt based on deviations in the rotational positions detected by the plurality of encoders, the rotational positions of the drive units are required to be continuously monitored during the operation units operate, so that a data amount is increased in arithmetic processing for the purpose of detecting an abnormality in the timing belt. Due to this, a load of the arithmetic processing in detecting an abnormality in the timing belt may be easily increased.

The present invention has been made in view of such a situation, and provides an injection molding machine that can reduce a load of the arithmetic processing in detecting an abnormality in a timing belt.

Means for Solving Problem

IN order to solve the above-described problem and achieve the object, the injection molding machine includes: a timing belt wound around a driving-side rotation member and a driven-side rotation member and configured to transmit power from the driving-side rotation member to the driven-side rotation member; a driving-side rotation detecting unit configured to detect a rotational speed of the driving-side rotation member; a driven-side rotation detecting unit configured to detect a rotational speed of the driven-side rotation member; and an abnormality detecting unit configured to detect an abnormality in the timing belt based on a relative speed difference between the rotational speed of the driving-side rotation member detected by the driving-side rotation detecting unit and the rotational speed of the driven-side rotation member detected by the driven-side rotation detecting unit in a predetermined period after the driving-side rotation member starts to rotate from a stopped state.

Effect of the Invention

The injection molding machine according to the present invention exhibits an effect of reducing a load of arithmetic processing in detecting an abnormality in a timing belt.

DESCRIPTION OF EMBODIMENTS

The following describes an embodiment of an injection molding machine according to the present disclosure in detail based on the drawings. The present invention is not limited to the embodiment. Constituent elements in the following embodiment include a constituent element that can be replaced and easily conceived by those skilled in the art, or substantially the same constituent element.

EMBODIMENT

Figure 1:
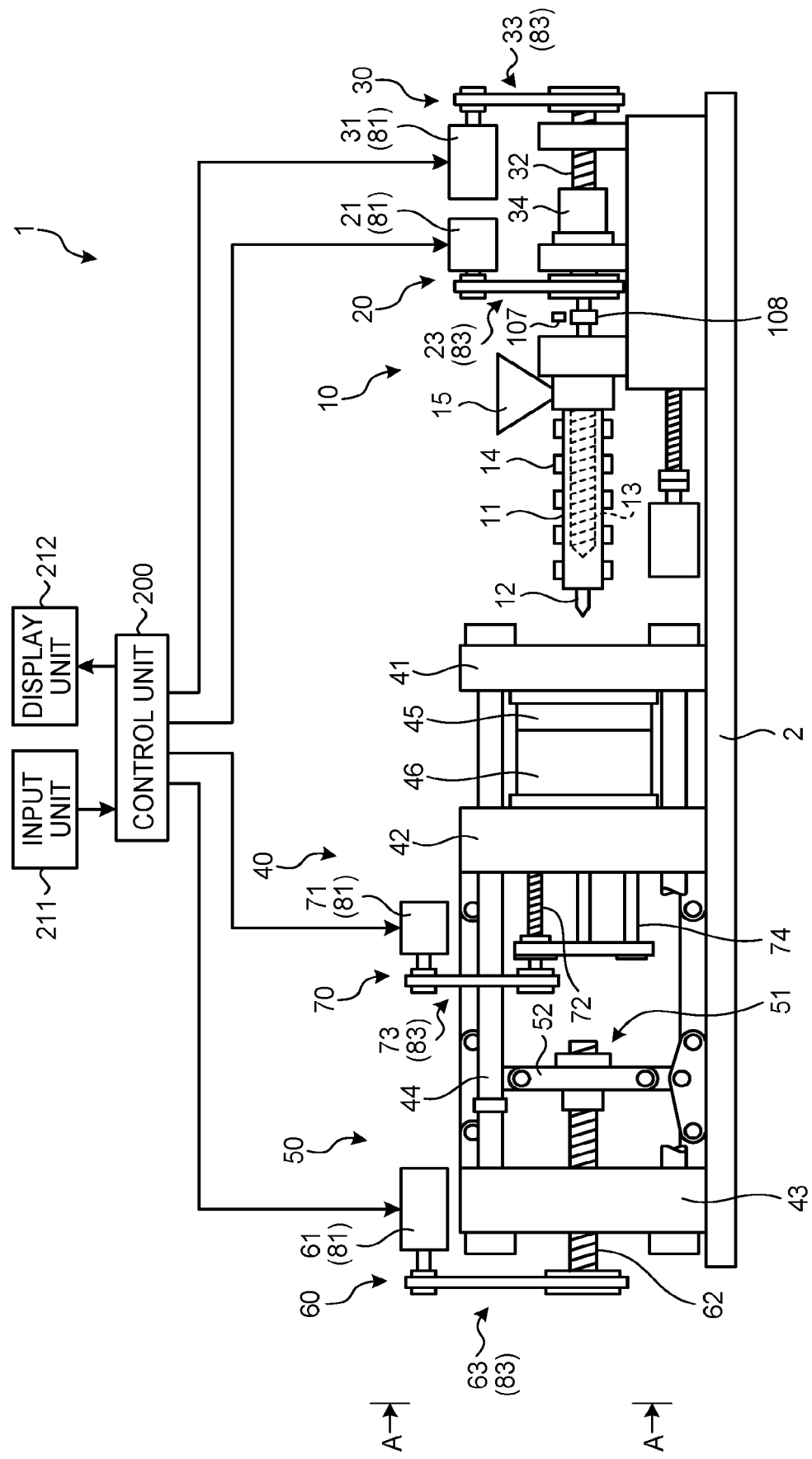
FIG. 1 is a schematic diagram illustrating a device configuration of an injection molding machine according to an embodiment.

FIG. 1 is a schematic diagram illustrating a device configuration of an injection molding machine 1 according to the embodiment. In the following description, a vertical direction in a normal use state of the injection molding machine 1 is also described as a vertical direction of the injection molding machine 1, and a horizontal direction in a normal use state of the injection molding machine 1 is also described as a horizontal direction of the injection molding machine 1.

The injection molding machine 1 according to the present embodiment includes an injection device 10 and a mold clamping device 40, and the injection device 10 and the mold clamping device 40 are placed on a frame 2 that is disposed at a lower end of the injection molding machine 1. The injection molding machine 1 can manufacture desired various molded articles by melting a molding material to be a plasticized material by the injection device 10, and cooling and solidifying the plasticized material injected from the injection device 10 by the mold clamping device 40.

Injection Device 10

The injection device 10 includes a heating barrel 11, a screw 13, a measuring unit 20, and an injection device drive unit 30. The heating barrel 11 is formed in a substantially cylindrical shape, disposed so that an axis direction thereof runs along a substantially horizontal direction, and includes a heater 14 such as a band heater disposed therein. Due to this, the heating barrel 11 can raise a temperature of the heating barrel 11 by the heater 14, and can heat and melt the molding material therein to be the plasticized material. The heating barrel 11 includes a nozzle 12 for injecting the plasticized material on one end side thereof, and the other end side is connected to a hopper 15 for putting a raw material. The screw 13 has a spiral shape the axis direction of which runs along the axis direction of the heating barrel 11, and is disposed in the heating barrel 11. The screw 13 is movable in the axis direction inside the heating barrel 11.

The measuring unit 20 includes a measuring servomotor 21, and a transmission mechanism 23 that transmits rotation of the measuring servomotor 21 to the screw 13 in the heating barrel 11. When the measuring servomotor 21 is driven, rotational driving force is transmitted to the screw 13 by the transmission mechanism 23, and the screw 13 is rotated in the heating barrel 11, resin as the molding material is introduced into the heating barrel 11 from the hopper 15. The introduced resin is heated in the heating barrel 11, and transmitted to a side on which the nozzle 12 is positioned in the heating barrel 11 while being kneaded. The resin is melted, and accumulated in a portion on an end part side on which the nozzle 12 is positioned in the heating barrel 11. The molding material is not limited to the resin, but may be any material that can be used as the molding material such as metal, glass, rubber, or a carbonized compound containing carbon fibers, for example.

The injection device drive unit 30 includes an injection servomotor 31, a ball screw 32, a transmission mechanism 33, and a coupling unit 34. The transmission mechanism 33 can transmit rotation of the injection servomotor 31 to the ball screw 32. The coupling unit 34 is coupled to the screw 13, and screwed to the ball screw 32 to be movable in the horizontal direction as the ball screw 32 rotates. The coupling unit 34 is coupled to the screw 13, so that, when the coupling unit 34 moves in the horizontal direction, the screw 13 also moves in the horizontal direction together with the coupling unit 34, and the measuring servomotor 21 and the transmission mechanism 23 also move in the horizontal direction integrally with the screw 13. Due to this, in the injection device drive unit 30, when the injection servomotor 31 rotates, the rotation of the injection servomotor 31 is transmitted to the ball screw 32, and the ball screw 32 rotates, the coupling unit 34 moves in the horizontal direction, and the screw 13 can be moved in the horizontal direction in the heating barrel 11. The injection device drive unit 30 can also extrude the molding material from the nozzle 12 by moving the screw 13 toward the nozzle 12 side in a state in which the melted molding material is accumulated in the portion on the end part side on which the nozzle 12 is positioned in the heating barrel 11. Due to this, the molding material in the heating barrel 11 can be injected from the nozzle 12.

Mold Clamping Device 40

The mold clamping device 40 includes a fixed plate 41, a movable plate 42, a supporting plate 43, a tie bar 44, a mold clamping drive mechanism 50, and an ejection mechanism 70. The fixed plate 41 and the supporting plate 43 are disposed on the frame 2 and fixed to the frame 2, and the fixed plate 41 is disposed between the injection device 10 and the supporting plate 43. In other words, the supporting plate 43 is disposed on a side opposite to a side on which the injection device 10 is positioned when viewed from the fixed plate 41 on the frame 2. A fixed metal mold 45 used for molding the plasticized material is attached to the fixed plate 41. The tie bar 44 extends in the horizontal direction, one end thereof is fixed to the fixed plate 41, and the other end thereof is fixed to the supporting plate 43.

The movable plate 42 is disposed between the fixed plate 41 and the supporting plate 43, and placed on a linear guide (not illustrated) disposed on the frame 2. The tie bar 44 penetrates the movable plate 42 that is disposed between the fixed plate 41 and the supporting plate 43 as described above, and passes through the movable plate 42 to extend between the fixed plate 41 and the supporting plate 43.

The movable plate 42 can move in the horizontal direction, in a direction in which a distance to the fixed plate 41 changes, by being guided by the tie bar 44 or the linear guide. That is, the movable plate 42 can move in a direction of approaching or moving away from the fixed plate 41. To a surface of the movable plate 42 disposed as described above, the surface on a side on which the fixed plate 41 is positioned, a movable metal mold 46 is attached. The movable metal mold 46 attached to the movable plate 42 is opposed to the fixed metal mold 45 attached to the fixed plate 41, and when the movable plate 42 approaches the fixed plate 41, the movable metal mold 46 approaches the fixed metal mold 45 to be combined with the fixed metal mold 45. When the movable metal mold 46 and the fixed metal mold 45 are combined with each other to be closed, a space corresponding to a shape of a molded article is formed between the movable metal mold 46 and the fixed metal mold 45.

On a surface of the fixed metal mold 45 on the opposite side of a side on which the movable metal mold 46 is positioned, that is, the surface on a side opposed to the heating barrel 11 of the injection device 10, a through hole is formed, the through hole communicating with the space between the movable metal mold 46 and the fixed metal mold 45 into which the melted molding material is injected.

The mold clamping drive mechanism 50 includes a toggle mechanism 51 and a toggle mechanism drive unit 60. The toggle mechanism drive unit 60 includes a mold clamping servomotor 61, a ball screw 62, and a transmission mechanism 63 for driving the toggle mechanism 51. The transmission mechanism 63 can transmit rotation of the mold clamping servomotor 61 to the ball screw 62. A crosshead 52 is screwed to the ball screw 62, and the crosshead 52 is movable in the horizontal direction as the ball screw 62 rotates. The crosshead 52 is disposed between the movable plate 42 and the supporting plate 43. Due to this, when the mold clamping servomotor 61 rotates, the rotation of the mold clamping servomotor 61 is transmitted to the ball screw 62, and the ball screw 62 rotates, the crosshead 52 moves in the horizontal direction to approach or move away from the movable plate 42.

The toggle mechanism 51 can work as the crosshead 52 moves. Specifically, in a case in which the crosshead 52 moves in a direction of approaching the movable plate 42, the toggle mechanism 51 can move the movable plate 42 toward the fixed plate 41, and can close the movable metal mold 46 and the fixed metal mold 45. In contrast, in a case in which the crosshead 52 moves in a direction of moving away from the movable plate 42, the toggle mechanism 51 can move the movable plate 42 in a direction of moving away from the fixed plate 41, and can close the movable metal mold 46 and the fixed metal mold 45.

The ejection mechanism 70 includes an ejection servomotor 71, a ball screw 72, a transmission mechanism 73, and an ejection member 74, and can remove the molded article after molding from the movable metal mold 46. The transmission mechanism 73 can transmit rotation of the ejection servomotor 71 to the ball screw 72. The ejection member 74 includes a portion including a distal end part penetrating an inner surface of the movable metal mold 46, and a portion screwed to the ball screw 72, and is movable in the horizontal direction as the ball screw 72 rotates. Due to this, when the ejection servomotor 71 rotates, the rotation of the ejection servomotor 71 is transmitted to the ball screw 72, and the ball screw 72 rotates, the ejection member 74 moves in the horizontal direction, and the ejection mechanism 70 can eject the molded article adhering to the inner surface of the movable metal mold 46 by the ejection member 74.

The injection molding machine 1 also includes a control unit 200 that performs various kinds of control for the injection molding machine 1, an input unit 211 by which an operator performs an input operation for the injection molding machine 1, and a display unit 212 that displays various kinds of information. The control unit 200 includes a central processing unit (CPU) that performs arithmetic processing, a random access memory (RAM) and a read only memory (ROM) functioning as memories for storing various kinds of information, and the like. All or part of the functions of the control unit 200 are implemented by loading an application program held by the ROM onto the RAM to be executed by the CPU, and reading out or writing data from/to the RAM or the ROM.

The input unit 211 and the display unit 212 are both connected to the control unit 200, and the input unit 211 transmits information of the input operation to the control unit 200. The display unit 212 displays the information transmitted from the control unit 200. Additionally, the heater 14, the measuring servomotor 21, and the injection servomotor 31 included in the injection device 10, and the mold clamping servomotor 61 and the ejection servomotor 71 included in the mold clamping device 40 are connected to the control unit 200, and operated by a control signal from the control unit 200.

Servomotor 81, Transmission Mechanism 83

Figure 2:
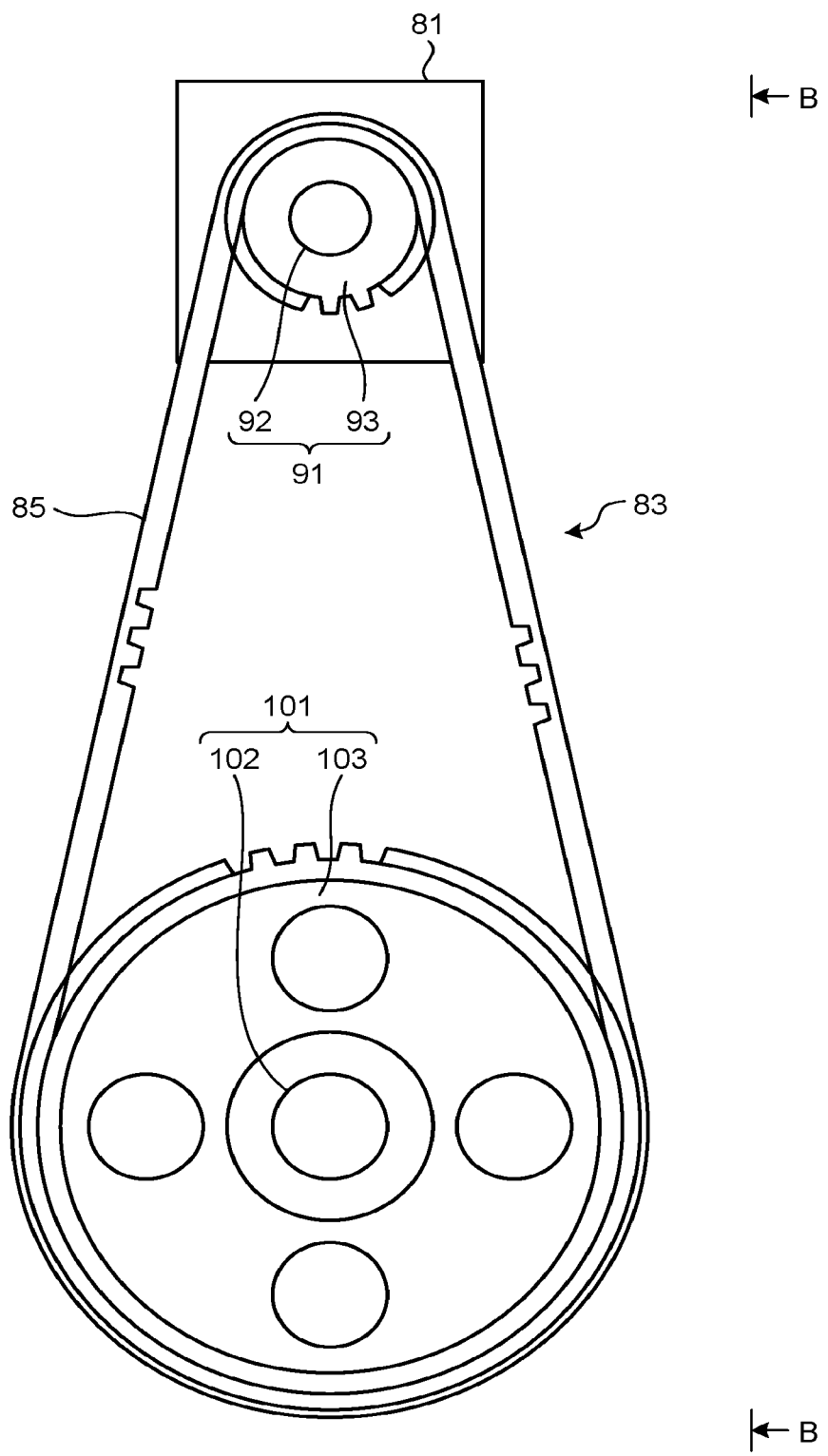
FIG. 2 is an arrow view along A-A in FIG. 1.
Figure 3:
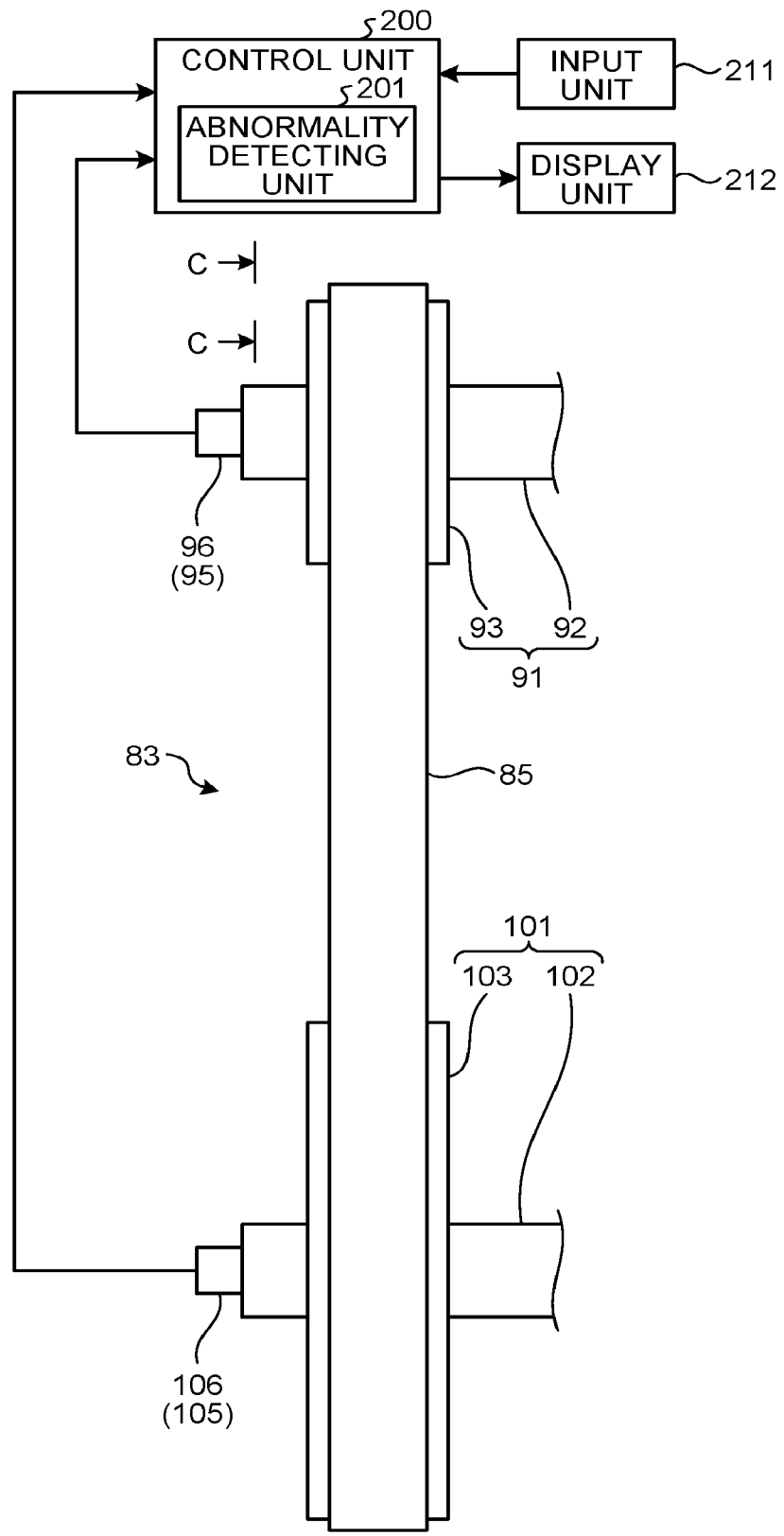
FIG. 3 is an arrow view along B-B in FIG. 2.

In the injection molding machine 1, the injection device 10 includes the measuring servomotor 21 and the injection servomotor 31, and the mold clamping device 40 includes the mold clamping servomotor 61 and the ejection servomotor 71. In the present embodiment, rotational speeds of these servomotors 81 can be detected. FIG. 2 is an arrow view along A-A in FIG. 1. FIG. 3 is an arrow view along B-B in FIG. 2. FIG. 2 illustrates the mold clamping servomotor 61 and the transmission mechanism 63 included in the mold clamping drive mechanism 50. In the following description, the measuring servomotor 21, the injection servomotor 31, the mold clamping servomotor 61, and the ejection servomotor 71 including the mold clamping servomotor 61 are described as the servomotors 81. Similarly, the transmission mechanisms 23, 33, 63, and 73 of the injection device 10 and the mold clamping drive mechanism 50 including the transmission mechanism 63 of the mold clamping drive mechanism 50 are also described as transmission mechanisms 83. In other words, FIG. 2 illustrates the mold clamping servomotor 61 and the transmission mechanism 63 included in the mold clamping drive mechanism 50 as representatives of the servomotors 81 and the transmission mechanisms 83 used in the injection molding machine 1.

The transmission mechanism 83 includes a driving-side pulley 93 attached to a drive shaft 92, a driven-side pulley 103 attached to a driven shaft 102, and a timing belt 85 wound around the driving-side pulley 93 and the driven-side pulley 103. The timing belt 85 is constituted of what is called a toothed belt, and the driving-side pulley 93 and the driven-side pulley 103 are pulleys adapted to the toothed belt.

Figure 4:
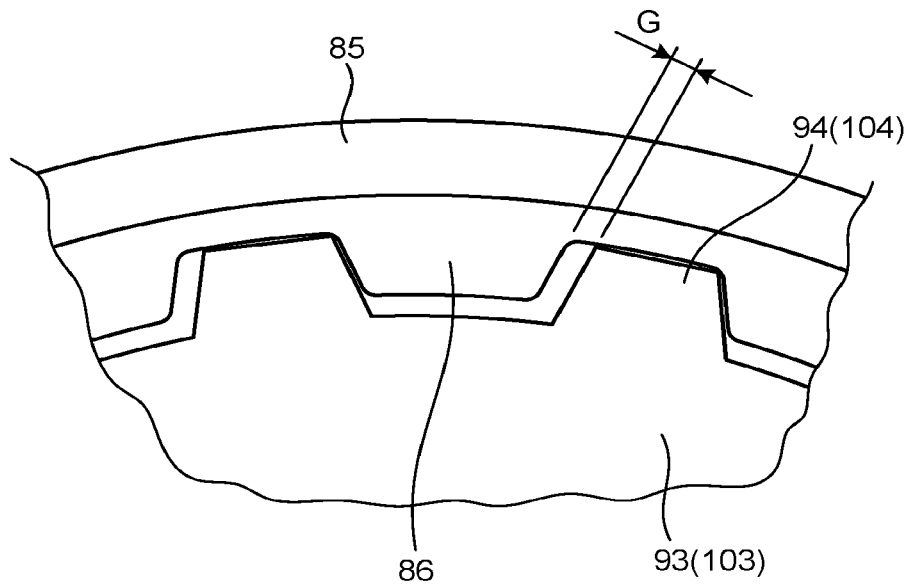
FIG. 4 is an arrow view along C-C in FIG. 3.

FIG. 4 is an arrow view along C-C in FIG. 3. The following describes the timing belt 85, the driving-side pulley 93, and the driven-side pulley 103 in detail. The timing belt 85 constituted of the toothed belt is an endless belt having a belt shape and a predetermined width, and includes a plurality of teeth 86 formed on an inner peripheral surface thereof. Each of the teeth 86 included in the timing belt 85 is formed in a shape of projecting from the inner peripheral surface in a width direction of the timing belt 85, and the teeth 86 are disposed side by side in a circumferential direction of the timing belt 85.

On outer peripheral surfaces of the driving-side pulley 93 and the driven-side pulley 103 around which the timing belt 85 is wound, a plurality of teeth to be engaged with the teeth 86 of the timing belt 85 are formed. For example, a plurality of teeth 94 projecting from an outer peripheral surface in a width direction of the driving-side pulley 93 are formed on the outer peripheral surface of the driving-side pulley 93, and the teeth 94 are disposed side by side in a circumferential direction of the driving-side pulley 93. Regarding the driving-side pulley 93 and the timing belt 85 wound around the driving-side pulley 93, when the teeth 94 of the driving-side pulley 93 engage with the teeth 86 of the timing belt 85, power can be transmitted between the driving-side pulley 93 and the timing belt 85.

Regarding the driven-side pulley 103, similarly, a plurality of teeth 104 projecting from an outer peripheral surface in a width direction of the driven-side pulley 103 are formed on the outer peripheral surface of the driven-side pulley 103, and the teeth 104 of the driven-side pulley 103 are disposed side by side in a circumferential direction of the driven-side pulley 103. Regarding the driven-side pulley 103 and the timing belt 85 wound around the driven-side pulley 103, when the teeth 104 of the driven-side pulley 103 engage with the teeth 86 of the timing belt 85, power can be transmitted between the driven-side pulley 103 and the timing belt 85.

Furthermore, power can be transmitted between the driving-side pulley 93 and the driven-side pulley 103 due to tension of the timing belt 85 wound around the driving-side pulley 93 and the driven-side pulley 103.

The drive shaft 92 to which the driving-side pulley 93 is attached is an output shaft of the servomotor 81, or a shaft that is coupled to the output shaft of the servomotor 81 to be integrally rotated. The driven shaft 102 to which the driven-side pulley 103 is attached is a shaft to be rotated when the power generated in the servomotor 81 is transmitted by the timing belt 85. Specifically, the driven shaft 102 is a shaft to be rotated integrally with the screw 13 to be rotated when rotation of the measuring servomotor 21 is transmitted thereto, the ball screw 32 to be rotated when rotation of the injection servomotor 31 is transmitted thereto, the ball screw 62 to be rotated when rotation of the mold clamping servomotor 61 is transmitted thereto, and the ball screw 72 to be rotated when rotation of the ejection servomotor 71 is transmitted thereto.

Among these elements, the drive shaft 92 and the driving-side pulley 93 that is attached to the drive shaft 92 to be rotated integrally with the drive shaft 92 are disposed as a driving-side rotation member 91. The servomotor 81 is a drive unit that causes the driving-side rotation member 91 to rotate. The driven shaft 102 and the driven-side pulley 103 that is attached to the driven shaft 102 to be rotated integrally with the driven shaft 102 are disposed as a driven-side rotation member 101. Thus, the timing belt 85 wound around the driving-side pulley 93 and the driven-side pulley 103 is, in other words, wound around the driving-side rotation member 91 and the driven-side rotation member 101, and transmits the power from the driving-side rotation member 91 that is generated by the servomotor 81 as the drive unit to the driven-side rotation member 101.

Driving-Side Rotation Detecting Unit 95, Driven-Side Rotation Detecting Unit 105

Of the driving-side rotation member 91 and the driven-side rotation member 101 that transmit power by the timing belt 85, a driving-side rotation detecting unit 95 for detecting a rotational speed of the driving-side rotation member 91 is disposed on the driving-side rotation member 91. As the driving-side rotation detecting unit 95, a driving-side encoder 96 serving as an encoder that detects the rotational speed of the driving-side rotation member 91 is used in the present embodiment. For example, as illustrated in FIG. 3, the driving-side encoder 96 is disposed in the vicinity of a shaft end of the drive shaft 92, and can detect the rotational speed of the drive shaft 92. Similarly, a driven-side rotation detecting unit 105 for detecting a rotational speed of the driven-side rotation member 101 is disposed on the driven-side rotation member 101. As the driven-side rotation detecting unit 105, a driven-side encoder 106 serving as an encoder that detects the rotational speed of the driven-side rotation member 101 is used in the present embodiment. For example, as illustrated in FIG. 3, the driven-side encoder 106 is disposed in the vicinity of a shaft end of the driven shaft 102, and can detect the rotational speed of the driven shaft 102.

The driving-side encoder 96 and the driven-side encoder 106 are connected to the control unit 200. The control unit 200 that performs various kinds of control for the injection molding machine 1 functionally includes an abnormality detecting unit 201 for detecting an abnormality in the timing belt 85. The abnormality detecting unit 201 can detect an abnormality in the timing belt 85 based on a relative speed difference between the rotational speed of the driving-side rotation member 91 detected by the driving-side rotation detecting unit 95 and the rotational speed of the driven-side rotation member 101 detected by the driven-side rotation detecting unit 105.

The driving-side rotation detecting unit 95 is not necessarily configured by disposing the driving-side encoder 96 in the vicinity of the shaft end of the drive shaft 92, and the driven-side rotation detecting unit 105 is not necessarily configured by disposing the driven-side encoder 106 in the vicinity of the shaft end of the driven shaft 102. For example, the driving-side rotation detecting unit 95 may be configured such that the driving-side encoder 96 is attached to the servomotor 81 so that a rotational speed of a rotating shaft of the servomotor 81 can be detected by the driving-side encoder 96.

In a configuration in which the driven-side encoder 106 cannot be disposed in the vicinity of the shaft end of the driven shaft 102 like the transmission mechanism (refer to FIG. 1) of the measuring servomotor 21, an element other than the driven-side encoder 106 may be used for the driven-side rotation detecting unit 105. For example, a gear wheel 108 (refer to FIG. 1) is formed on the driven-side rotation member 101, a proximity sensor 107 (refer to FIG. 1) is disposed in the vicinity of the gear wheel 108, and the proximity sensor 107 that detects the rotational speed of the driven-side rotation member 101 by detecting teeth of the gear wheel 108 may be used as the driven-side rotation detecting unit 105.

Alternatively, the driving-side rotation detecting unit 95 may detect the rotational speed of the driving-side rotation member 91 by disposing a proximity sensor in the vicinity of the teeth 94 of the driving-side pulley 93 to detect the teeth 94 by the proximity sensor, and the driven-side rotation detecting unit 105 may detect the rotational speed of the driven-side rotation member 101 by disposing a proximity sensor in the vicinity of the teeth 104 of the driven-side pulley 103 to detect the teeth 104 by the proximity sensor. Any disposed position or any method for detecting the rotational speed may be used so long as the driving-side rotation detecting unit 95 can detect the rotational speed of the driving-side rotation member 91, and the driven-side rotation detecting unit 105 can detect the rotational speed of the driven-side rotation member 101.

Working of Injection Molding Machine 1

The injection molding machine 1 according to the present embodiment includes the configurations as described above, and the following describes working thereof. Assuming that one injection/molding operation is one cycle, the injection molding machine 1 repeatedly performs the cycle of injection/molding operation. Each cycle includes a plurality of processes for injecting the molding material, and molding a product. Each cycle includes, for example, a mold closing process, a pressure raising process, a filling (injection) process, a pressure keeping process, a measuring process, a mold opening process, and an ejection process.

The mold closing process is a process of combining the movable metal mold 46 with the fixed metal mold 45, and forming a space corresponding to a product shape between the movable metal mold 46 and the fixed metal mold 45. In the mold closing process, the control unit 200 drives the mold clamping servomotor 61 to cause the toggle mechanism 51 to work in a direction in which the movable metal mold 46 approaches the fixed metal mold 45. Due to this, the movable metal mold 46 is brought into contact with the fixed metal mold 45.

The following pressure raising process is a process of pressing the movable metal mold 46 against the fixed metal mold 45 until a mold clamping force between the movable metal mold 46 and the fixed metal mold 45 reaches a set value after the mold closing process, and raising a pressure of the movable metal mold 46 with respect to the fixed metal mold 45. In the pressure raising process, the control unit 200 further drives the mold clamping servomotor 61 in a state of combining the movable metal mold 46 with the fixed metal mold 45. Due to this, the movable metal mold 46 is pressed against the fixed metal mold 45 until the mold clamping force between the movable metal mold 46 and the fixed metal mold 45 reaches a predetermined set value.

The following filling (injection) process is a process of pressing the nozzle 12 included in the heating barrel 11 of the injection device 10 against the through hole of the fixed metal mold 45, and injecting the molding material melted by the heating barrel 11 into the space between the movable metal mold 46 and the fixed metal mold 45. In the filling process, the control unit 200 drives the injection servomotor 31, and transmits power generated by the injection servomotor 31 to the ball screw 32 by the transmission mechanism 33 to rotate the ball screw 32. When the ball screw 32 is rotated, the coupling unit 34 screwed to the ball screw 32 moves toward a side on which the fixed metal mold 45 is positioned, and the screw 13 in the heating barrel 11 coupled with the coupling unit 34 also moves in a direction of approaching the fixed metal mold 45 as the coupling unit 34 moves. Due to this, the screw 13 extrudes the melted molding material accumulated in the portion on the end part side on which the nozzle 12 is positioned in the heating barrel 11 toward the space between the fixed metal mold 45 and the movable metal mold 46 through the nozzle 12. That is, the injection device 10 injects the melted molding material toward the space between the fixed metal mold 45 and the movable metal mold 46 of the mold clamping device 40.

The following pressure keeping process is a process of keeping an injection pressure so that the molding material is filled into the space between the fixed metal mold 45 and the movable metal mold 46 without a gap after the injection process. Thus, in the pressure keeping process, the control unit 200 controls the injection servomotor 31 so that the injection pressure of the molding material with respect to the space between the fixed metal mold 45 and the movable metal mold 46 is kept at a predetermined set value.

The following measuring process is a process of sending the molding material to be injected in the next cycle to the end part side on which the nozzle 12 is positioned in the heating barrel 11 to prepare the molding material to be used in the next cycle. In the measuring process, the control unit 200 drives the measuring servomotor 21, and transmits power generated by the measuring servomotor 21 to the screw 13 in the heating barrel 11 by the transmission mechanism 23 to rotate the screw 13 at a predetermined rotational speed. Due to this, the molding material before being melted is introduced into the heating barrel 11 through the hopper 15. The control unit 200 raises the temperature of the inside of the heating barrel 11 to melt the molding material in the heating barrel 11 by causing the heater 14 to work. In the measuring process, by rotating the screw 13 while melting the molding material in the heating barrel 11 as described above, a predetermined amount of the melted molding material is sent to the nozzle 12 side in the heating barrel 11 while being kneaded.

The following mold opening process is a process of separating the movable metal mold 46 from the fixed metal mold 45 to take out the molded article molded by the fixed metal mold 45 and the movable metal mold 46. In the mold opening process, the control unit 200 drives the mold clamping servomotor 61 to cause the toggle mechanism 51 to work in a direction in which the movable metal mold 46 moves away from the fixed metal mold 45. Due to this, the movable metal mold 46 is separated from the fixed metal mold 45.

The following ejection process is a process of ejecting the molded article from the movable metal mold 46 by the ejection member 74 to remove the molded article from the movable metal mold 46. In the ejection process, the control unit 200 drives the ejection servomotor 71, and transmits power generated by the ejection servomotor 71 to the ball screw 72 by the transmission mechanism 73 to rotate the ball screw 72. When the ball screw 72 rotates, the ejection member 74 screwed to the ball screw 72 moves toward a side on which the movable metal mold 46 is positioned, and the ejection member 74 is brought into contact with the molded article adhering to an inner surface of the movable metal mold 46 to eject the molded article. Due to this, the molded article is removed from the movable metal mold 46.

In molding the molded article by the injection molding machine 1, these cycles of the injection/molding operation are repeatedly performed. In the repeatedly performed cycles, the control unit 200 continuously heats the inside of the heating barrel 11 by the heater 14 so that the molding material in the heating barrel 11 can be smoothly injected. Due to this, the heating barrel 11 holds the molding material in a melted state.

The control unit 200 performs control while determining a start timing or an end timing of each process in the cycle of the injection/molding operation. To determine the start timing or the end timing of each process, for example, a flag is specified in advance for the first step or the last step of each process in a computer program for causing the injection molding machine 1 to operate by the control unit 200. Due to this, the control unit 200 can determine the start timing or the end timing of each process when the computer program for causing the injection molding machine 1 to operate is being executed. That is, by specifying the flag, the control unit 200 can determine that the processing proceeds to the next process when the flag is executed before the processing or after the processing at the step of each process.

When the process proceeds, the control unit 200 causes the display unit 212 to display proceeding of the process. That is, the display unit 212 displays a current process of the injection molding machine 1. Due to this, the operator can recognize a current operation state of the injection molding machine 1 by visually recognizing the display unit 212.

During operation of the injection molding machine 1, the process successively proceeds as described above, so that the servomotors 81 included in the injection molding machine 1 are repeatedly operated and stopped following proceeding of the process. In other words, the servomotors 81 are repeatedly operated and stopped to cause the process of operation of the injection molding machine 1 to proceed.

In this case, the power generated by the servomotor 81 is transmitted from the drive shaft 92 side to the driven shaft 102 side by the timing belt 85 wound around the driving-side pulley 93 and the driven-side pulley 103, but an abnormality may occur in the timing belt 85 when the power is repeatedly transmitted. Examples of the abnormality in the timing belt 85 include a stretch of the timing belt 85 and wear of the teeth 86 of the timing belt 85.

In a case in which a stretch is caused in the timing belt 85, and tension of the timing belt 85 is reduced, the power generated by the servomotor 81 tends to be transmitted to the driven-side rotation member 101 with delay at the time when the servomotor 81 starts to operate. Thus, at the time when the servomotor 81 starts to operate, delay tends to be caused in a timing at which the driven-side rotation member 101 starts to rotate and the rotational speed of the driven-side rotation member 101 with respect to a timing at which the driving-side rotation member 91 starts to rotate and the rotational speed of the driving-side rotation member 91.

Similarly, in a case in which the teeth 86 of the timing belt 85 are worn, the power generated by the servomotor 81 is transmitted to the driven-side rotation member 101 with delay at the time when the servomotor 81 starts to operate. That is, in a case in which the teeth 86 of the timing belt 85 are worn, what is called a backlash G (refer to FIG. 4) gets larger, the backlash G as a gap between the teeth 86 of the timing belt 85, and the teeth 94 and 104 of the driving-side pulley 93 and the driven-side pulley 103. In a case in which the backlash G gets larger, as compared with a state in which the backlash G is small, delay tends to be caused in a timing at which the power is transmitted from the driving-side pulley 93 to the timing belt 85 at the time when the servomotor 81 starts to operate, or a timing at which the power is transmitted from the timing belt 85 to the driven-side pulley 103. Thus, in a case in which the backlash G gets larger, similarly to the case in which the tension of the timing belt 85 is reduced, at the time when the servomotor 81 starts to operate, delay tends to be caused in the timing at which the driven-side rotation member 101 starts to rotate and the rotational speed of the driven-side rotation member 101 with respect to the timing at which the driving-side rotation member 91 starts to rotate and the rotational speed of the driving-side rotation member 91.

In a case in which an abnormality occurs in the timing belt 85, there is the risk that the power cannot be transmitted at an appropriate timing at the time when the servomotor 81 starts to operate as described above. In a case in which the timing belt 85 is stretched more largely, or the size of the backlash G is further increased, tooth skipping may be caused. The injection molding machine 1 according to the present embodiment can detect an abnormality in the timing belt 85 by the abnormality detecting unit 201 included in the control unit 200.

Detection of Abnormality in Timing Belt 85

The abnormality detecting unit 201 detects an abnormality in the timing belt 85 based on the relative speed difference between the rotational speed of the driving-side rotation member 91 and the rotational speed of the driven-side rotation member 101 in a predetermined period after the driving-side rotation member 91 starts to rotate from a stopped state. That is, when the stopped servomotor 81 starts to operate, the abnormality detecting unit 201 acquires, from the driving-side rotation detecting unit 95 and the driven-side rotation detecting unit 105, the rotational speed of the driving-side rotation member 91 and the rotational speed of the driven-side rotation member 101 in the predetermined period after the servomotor 81 starts to rotate from the stopped state.

Figure 5:
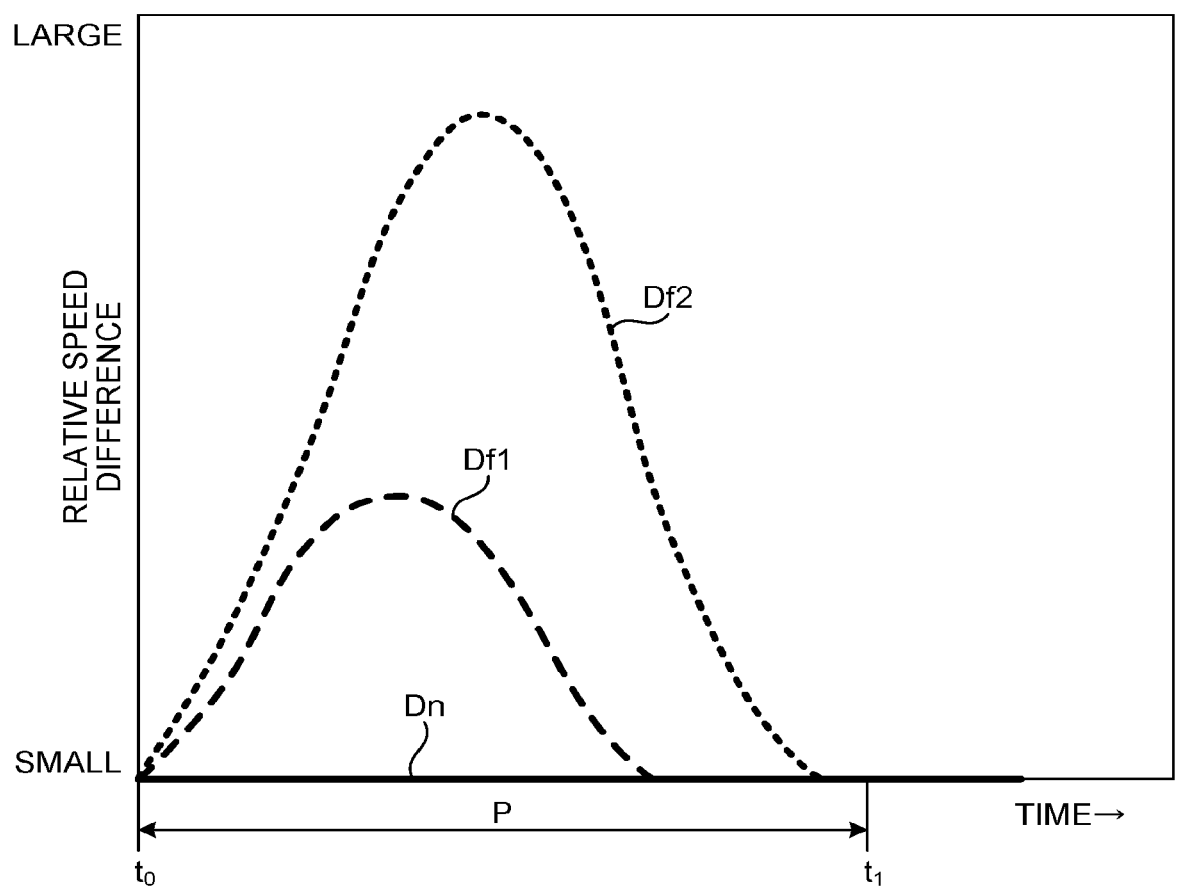
FIG. 5 is an explanatory diagram for explaining a relative speed difference between a driving-side and a driven-side at the time of starting operation.

FIG. 5 is an explanatory diagram for explaining the relative speed difference between the driving-side and the driven-side at the time of starting operation. Regarding the relative speed difference between the rotational speed of the driving-side rotation member 91 and the rotational speed of the driven-side rotation member 101, in a state in which a stretch is not caused in the timing belt 85 and the teeth 86 of the timing belt 85 are not worn, the relative speed difference is hardly caused even immediately after the driving-side rotation member 91 starts to rotate. That is, a speed difference Dn under a normal condition as the relative speed difference in a normal condition of the timing belt 85 when an abnormality does not occur in the timing belt 85 is substantially 0 even immediately after the driving-side rotation member 91 starts to rotate.

On the other hand, in a state in which a stretch is caused in the timing belt 85, and the tension of the timing belt 85 is reduced, rotation of the driving-side rotation member 91 transmitted by the timing belt 85 is difficult to be quickly transmitted to the driven-side rotation member 101 at the time when the driving-side rotation member 91 in the stopped state starts to rotate. Due to this, a speed difference Df1 under a tension-reduced condition as the relative speed difference in a state in which the tension of the timing belt 85 is reduced is larger than the speed difference Dn under a normal condition immediately after the driving-side rotation member 91 starts to rotate.

Additionally, in a state in which a stretch is caused in the timing belt 85, and the teeth 86 of the timing belt 85 are worn, the rotation of the driving-side rotation member 91 at the time when the driving-side rotation member 91 starts to rotate is more difficult to be transmitted to the driven-side rotation member 101. Due to this, a speed difference Df2 under a belt-worn condition as the relative speed difference in a state in which the tension of the timing belt 85 is reduced and the teeth 86 of the timing belt 85 are worn becomes further larger than the speed difference Df1 under a tension-reduced condition immediately after the driving-side rotation member 91 starts to rotate.

In a case in which a stretch is caused in the timing belt 85 or the teeth 86 of the timing belt 85 are worn, as described above, the relative speed difference between the driving-side rotation member 91 and the driven-side rotation member 101 at the time when the driving-side rotation member 91 in the stopped state starts to rotate becomes larger. However, even in this case, the relative speed difference is gradually reduced with a lapse of time. That is, as acceleration of the rotation of the driving-side rotation member 91 is reduced, the rotational speed of the driven-side rotation member 101 gradually gets closer to the rotational speed of the driving-side rotation member 91. Due to this, the speed difference Df1 under a tension-reduced condition or the speed difference Df2 under a belt-worn condition, which is the relative speed difference between the driving-side rotation member 91 and the driven-side rotation member 101 at the time when an abnormality occurs in the timing belt 85, is reduced with a lapse of time.

In a case in which an abnormality occurs in the timing belt 85, when the driving-side rotation member 91 in the stopped state starts to rotate, the relative speed difference between the driving-side rotation member 91 and the driven-side rotation member 101 is increased, and reduced with a lapse of time as described above. Thus, the abnormality detecting unit 201 for detecting an abnormality in the timing belt 85 determines whether an abnormality occurs in the timing belt 85 based on the relative speed difference between the rotational speeds of the driving-side rotation member 91 and the driven-side rotation member 101 in the predetermined period after the driving-side rotation member 91 starts to rotate from the stopped state.

As the predetermined period for detecting an abnormality in the timing belt 85, used is a time until the rotational speed of the servomotor 81 reaches a specified rotational speed set in advance at the time when the servomotor 81 for rotating the driving-side rotation member 91 starts to rotate from the stopped state, for example. That is, a time from time $t_0$ at which the stopped servomotor 81 starts to operate until time $t_1$ at which the rotational speed of the servomotor 81 reaches the specified rotational speed defined as a rotational speed in a normal operation condition of the servomotor 81 is used as a predetermined period P for detecting an abnormality in the timing belt 85.

Regarding elapse of the predetermined period P, whether the rotational speed of the servomotor 81 reaches the specified rotational speed may be determined based on a detection result obtained by the driving-side rotation detecting unit 95, and whether the predetermined period P has elapsed may be determined based on the determination result. Alternatively, the control unit 200 may previously store the time until the rotational speed reaches the specified rotational speed after the servomotor 81 starts to operate for each of the servomotors 81, and may use the time until the rotational speed reaches the specified rotational speed for each of the servomotors 81 may be used as the predetermined period P for each of the servomotors 81.

The abnormality detecting unit 201 calculates an integrated value of the relative speed difference in the predetermined period P, and determines an abnormality in the timing belt 85 based on the calculated integrated value. That is, the abnormality detecting unit 201 continuously acquires, on a time-series basis, the relative speed difference between the rotational speed of the driving-side rotation member 91 and the rotational speed of the driven-side rotation member 101 in the predetermined period P after the driving-side rotation member 91 starts to rotate from the stopped state, and calculates the integrated value of the relative speed difference in the predetermined period P after the driving-side rotation member 91 starts to rotate. In a case in which the integrated value of the relative speed difference calculated as described above is larger than a predetermined value, the abnormality detecting unit 201 determines that an abnormality occurs in the timing belt 85.

The predetermined value of the integrated value of the relative speed difference used for determining whether an abnormality occurs in the timing belt 85, that is, a threshold of the integrated value, is set in advance and stored in the control unit 200. The abnormality detecting unit 201 compares the threshold stored in the control unit 200 with the integrated value of the relative speed difference between the driving-side rotation member 91 and the driven-side rotation member 101 in the predetermined period P that is calculated based on the detection result obtained by the driving-side rotation detecting unit 95 and a detection result obtained by the driven-side rotation detecting unit 105, and determines that an abnormality occurs in the timing belt 85 in a case in which the calculated integrated value is larger than the predetermined threshold.

It is preferable that the threshold of the integrated value of the relative speed difference is appropriately set in accordance with the rotational speeds of the driving-side rotation member 91 and the driven-side rotation member 101, a distance between the driving-side rotation member 91 and the driven-side rotation member 101, a total length of the timing belt 85, and the like. That is, the relative speed difference appears differently, and the integrated value with which it is possible to determine that an abnormality occurs in the timing belt 85 is different depending on a positional relation between the driving-side pulley 93 and the driven-side pulley 103, a speed reducing ratio or a speed increasing ratio, or the rotational speed thereof, so that the threshold of the integrated value of the relative speed difference is preferably set for each of the servomotors 81, that is, for each of the transmission mechanisms 83.

By determining an abnormality in the timing belt 85 based on the integrated value of the relative speed difference between the driving-side rotation member 91 and the driven-side rotation member 101 in the predetermined period P after the driving-side rotation member 91 starts to rotate, in a case in which the integrated value is larger than the predetermined threshold because the relative speed difference is the speed difference Df1 under a tension-reduced condition described above, for example, the abnormality detecting unit 201 determines that an abnormality occurs in the timing belt 85. Similarly, also in a case in which the integrated value of the relative speed difference is larger than the predetermined threshold because the relative speed difference is the speed difference Df2 under a belt-worn condition described above, the abnormality detecting unit 201 determines that an abnormality occurs in the timing belt 85.

The injection molding machine 1 includes a plurality of the servomotors 81, and includes a plurality of the transmission mechanisms 83. The abnormality detecting unit 201 determines an abnormality in the timing belt 85 for all of the transmission mechanisms 83. That is, the abnormality detecting unit 201 calculates the integrated value of the relative speed difference between the driving-side rotation member 91 and the driven-side rotation member 101 in the predetermined period P after the driving-side rotation member 91 starts to rotate for all of the transmission mechanisms 83, and determines an abnormality in the timing belt 85 based on the calculated integrated value. Each of the servomotors 81 repeatedly operates and stops for each operation process of the injection molding machine 1, so that the driving-side rotation member 91 of each of the transmission mechanisms 83 repeatedly rotates and stops for each operation process. The abnormality detecting unit 201 determines an abnormality in the timing belt 85 every time the driving-side rotation member 91 of each of the transmission mechanisms 83 starts to rotate.

In a case in which the abnormality detecting unit 201 determines that an abnormality occurs in the timing belt 85, the control unit 200 causes the display unit 212 to display that the abnormality occurs in the timing belt 85. At this point, the control unit 200 causes the display unit 212 to also display that the abnormality occurs in the timing belt 85 of which of the transmission mechanisms 83 included in the injection molding machine 1. That is, in a case in which an abnormality occurs in the timing belt 85, the display unit 212 is caused to also display information about the transmission mechanism 83 in which the abnormality occurs. Due to this, the abnormality detecting unit 201 notifies the operator that the abnormality occurs in the timing belt 85.

Effect of Embodiment

In the injection molding machine 1 according to the embodiment described above, the abnormality detecting unit 201 detects an abnormality in the timing belt 85 based on the relative speed difference between the driving-side rotation member 91 and the driven-side rotation member 101 in the predetermined period P after the driving-side rotation member 91 starts to rotate from the stopped state, so that an abnormality in the timing belt 85 can be detected only by monitoring the state of the transmission mechanism 83 for a short period. Due to this, arithmetic processing performed by the control unit 200 can be reduced in detecting an abnormality in the timing belt 85. That is, an abnormality in the timing belt 85 proceeds during a long-term operation of the injection molding machine 1, but whether an abnormality occurs in the timing belt 85 is not continuously monitored, but monitored only during the predetermined period P after the driving-side rotation member 91 starts to rotate, so that a monitoring time can be shortened in detecting an abnormality in the timing belt 85. Additionally, a data amount to be processed in detecting an abnormality in the timing belt 85 can also be reduced, so that the arithmetic processing performed for detecting an abnormality in the timing belt 85 can be reduced. As a result, a load of the arithmetic processing in detecting an abnormality in the timing belt 85 can be reduced.

The relative speed difference between the driving-side rotation member 91 and the driven-side rotation member 101, which is caused when the tension of the timing belt 85 is reduced or when the teeth 86 of the timing belt 85 are worn, is not caused under a steady operation condition, that is, when the driving-side rotation member 91 rotates at a constant speed, but is caused when the driving-side rotation member 91 starts to rotate. Thus, by detecting the relative speed difference between the driving-side rotation member 91 and the driven-side rotation member 101 in the predetermined period P after the driving-side rotation member 91 starts to rotate, it is possible to more securely determine that the timing belt 85 is in a state of causing the relative speed difference between the driving-side rotation member 91 and the driven-side rotation member 101 at the time when the driving-side rotation member 91 rotates. As a result, an abnormality in the timing belt 85 can be detected more securely.

The abnormality detecting unit 201 determines that an abnormality occurs in the timing belt 85 in a case in which the integrated value of the relative speed difference between the driving-side rotation member 91 and the driven-side rotation member 101 is larger than the predetermined value in the predetermined period P after the driving-side rotation member 91 starts to rotate from the stopped state, so that an abnormality in the timing belt 85 can be detected more securely. That is, the relative speed difference between the driving-side rotation member 91 and the driven-side rotation member 101 is minute, so that whether an abnormality occurs in the timing belt 85 can be determined more securely by using the relative speed difference as a minute value by calculating the integrated value of the relative speed in the predetermined period P, and determining an abnormality in the timing belt 85 based on the integrated value. As a result, an abnormality in the timing belt 85 can be detected more securely.

Additionally, the predetermined period P after the driving-side rotation member 91 starts to rotate is the time from when the servomotor 81 for rotating the driving-side rotation member 91 starts to rotate from the stopped state until the rotational speed of the servomotor 81 reaches the rotational speed set in advance, so that the relative speed difference between the driving-side rotation member 91 and the driven-side rotation member 101 can be detected more appropriately. That is, during a period from when the servomotor 81 starts to rotate from the stopped state until the rotational speed of the servomotor 81 reaches the rotational speed set in advance, the rotational speed of the driving-side rotation member 91 is continuously increased. In a case in which an abnormality occurs in the timing belt 85, the relative speed difference between the driving-side rotation member 91 and the driven-side rotation member 101 is not caused in a state in which the driving-side rotation member 91 rotates at a constant speed, but is caused in a state in which the rotational speed of the driving-side rotation member 91 is increased to be accelerated. Thus, by causing the predetermined period P for determining occurrence of an abnormality in the timing belt 85 to be the time until the rotational speed of the servomotor 81 reaches the rotational speed set in advance from the stopped state, the relative speed difference between the driving-side rotation member 91 and the driven-side rotation member 101 can be detected more appropriately. As a result, an abnormality in the timing belt 85 can be detected more securely, and a load of the arithmetic processing in detecting an abnormality in the timing belt 85 can be reduced more securely.

Modification

In the embodiment described above, only one threshold is set for the integrated value of the relative speed difference between the driving-side rotation member 91 and the driven-side rotation member 101 in the predetermined period P, but a plurality of the thresholds may be set for the integrated value. For example, as the thresholds for the integrated value of the relative speed difference, two thresholds may be set, the thresholds including a first threshold with which it is determined that the tension of the timing belt 85 is reduced, and a second threshold with which it is determined that the tension of the timing belt 85 is reduced, and the teeth 86 of the timing belt 85 are worn. In this case, the second threshold is larger than the first threshold.

In this way, by setting two types of different thresholds, the abnormality detecting unit 201 may determine that an abnormality does not occur in the timing belt 85 in a case in which the integrated value of the relative speed difference is smaller than the first threshold, determine that the tension of the timing belt 85 is reduced in a case in which the integrated value is equal to or larger than the first threshold and smaller than the second threshold, and determine that the tension of the timing belt 85 is reduced and the teeth 86 of the timing belt 85 are worn in a case in which the integrated value is equal to or larger than the second threshold. In this case, when the control unit 200 causes the display unit 212 to display that an abnormality occurs in the timing belt 85, it is preferable to cause the display unit 212 to display the abnormality of the timing belt 85 such that whether only the tension of the timing belt 85 is reduced, or whether not only the tension of the timing belt 85 is reduced but also the teeth 86 of the timing belt 85 are suspected to be worn. Due to this, the operator can recognize the abnormality in the timing belt 85 more appropriately.

In the embodiment described above, in a case in which it is determined that the abnormality occurs in the timing belt 85, a notification is given to the operator by being displayed on the display unit 212, but the notification may be given to the operator by a method other than display on the display unit 212. For example, the notification may be given to the operator by disposing a speaker (not illustrated) connected to the control unit 200, and causing the speaker to emit a sound. Any method can be used so long as occurrence of an abnormality in the timing belt 85 can be notified to the operator. Alternatively, in a case in which the abnormality detecting unit 201 determines that an abnormality occurs in the timing belt 85, the control unit 200 may make an output to an external personal computer (PC) or a programmable logic controller (PLC) by communication and the like. By making an output to these appliances, a time at which an abnormality occurs in the timing belt 85 can be recorded, or information about occurrence of an abnormality in the timing belt 85 can be used for other control.

In the embodiment described above, as the predetermined period P for detecting an abnormality in the timing belt 85, used is the time until the rotational speed of the servomotor 81 reaches the rotational speed set in advance from the stopped state, but the predetermined period P may be a time other than that time. For example, the predetermined period P may be set based on a rotation angle after the driving-side rotation member 91 starts to rotate, or may be directly set from the time after the driving-side rotation member 91 starts to rotate.

In the embodiment described above, the abnormality detecting unit 201 detects an abnormality in the timing belt 85 based on the integrated value of the relative speed difference between the driving-side rotation member 91 and the driven-side rotation member 101 in the predetermined period P, but may detect an abnormality in the timing belt 85 by using another method. The abnormality detecting unit 201 may determine an abnormality in the timing belt 85 by comparing the relative speed difference between the driving-side rotation member 91 and the driven-side rotation member 101 with a threshold, or may determine an abnormality in the timing belt 85 based on a time at which the relative speed difference is caused between the rotational speeds of the driving-side rotation member 91 and the driven-side rotation member 101.

Figure 6:
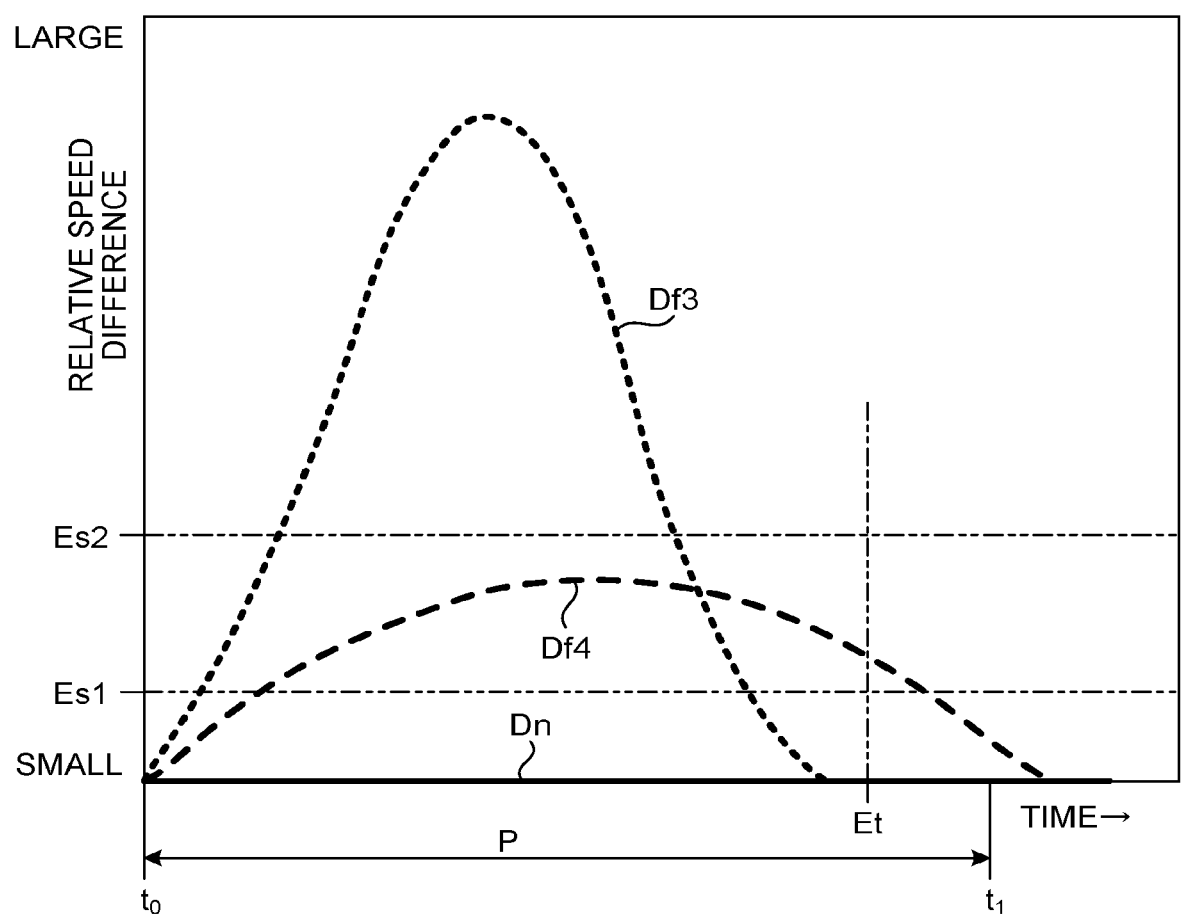
FIG. 6 is a modification of the injection molding machine according to the embodiment, and is an explanatory diagram of a case of determining an abnormality in a timing belt based on the relative speed difference and a time.

FIG. 6 is a modification of the injection molding machine 1 according to the embodiment, and is an explanatory diagram of a case of determining an abnormality in the timing belt 85 based on the relative speed difference and the time. In a case of determining an abnormality in the timing belt 85 by comparing the relative speed difference between the driving-side rotation member 91 and the driven-side rotation member 101 with the threshold, for example, a predetermined threshold Es2 is set for the relative speed difference as illustrated in FIG. 6. In this case, the abnormality detecting unit 201 compares the relative speed difference Df3 between the driving-side rotation member 91 and the driven-side rotation member 101 in the predetermined period P with the threshold Es2, and determines that an abnormality occurs in the timing belt 85 when the relative speed difference Df3 becomes larger than the threshold Es2.

In a case of determining an abnormality in the timing belt 85 based on the time when the relative speed difference is caused between the rotational speeds of the driving-side rotation member 91 and the driven-side rotation member 101, for example, the predetermined threshold Es1 is set for the relative speed difference, and a time Et for comparing the detected relative speed difference with the threshold Es1 is also set as illustrated in FIG. 6. The threshold Es1 in this case is preferably smaller than the threshold Es2 that is used for determining an abnormality in the timing belt 85 by being compared with the relative speed difference. The predetermined time Et from the time $t_0$ at which the driving-side rotation member 91 starts to rotate may be shorter than the predetermined period P, or may be longer than the predetermined period P.

In a case of determining occurrence of an abnormality in the timing belt 85 using the threshold Es1 and the time Et, the abnormality detecting unit 201 compares a relative speed difference Df4 between the rotational speeds of the driving-side rotation member 91 and the driven-side rotation member 101 with the threshold Es1 after the predetermined time Et has elapsed after the driving-side rotation member 91 starts to rotate. Based on this comparison, in a case in which the relative speed difference Df4 after the predetermined time Et has elapsed is larger than the threshold Es1, the abnormality detecting unit 201 determines that an abnormality occurs in the timing belt 85. That is, the abnormality detecting unit 201 determines that an abnormality occurs in the timing belt 85 in a case in which it can be determined that a difference is present in the rotational speeds because the relative speed difference Df4 between the rotational speed of the driving-side rotation member 91 and the rotational speed of the driven-side rotation member 101 is larger than the threshold Es1 even after the predetermined time Et has elapsed after the driving-side rotation member 91 starts to rotate.

Due to this, even when the relative speed difference between the rotational speeds of the driving-side rotation member 91 and the driven-side rotation member 101 is not abruptly increased after the driving-side rotation member 91 starts to rotate, the abnormality detecting unit 201 determines that an abnormality occurs in the timing belt 85 if it can be determined that the relative speed difference is continuously caused for a long period. Even in a case in which an abnormality occurs in the timing belt 85, a way of occurrence of the relative speed difference may be different depending on a form of the abnormality in the timing belt 85, the rotational speeds of the driving-side rotation member 91 and the driven-side rotation member 101, and the like. Thus, by comparing the relative speed difference with the threshold Est, or comparing the relative speed difference after the predetermined time Et has elapsed after the driving-side rotation member 91 is started with the threshold Es1, whether an abnormality occurs in the timing belt 85 can be determined irrespective of the form of the abnormality in the timing belt 85 and the rotational speeds of the driving-side rotation member 91 and the driven-side rotation member 101. As a result, an abnormality in the timing belt 85 can be detected more securely.

In the embodiment described above, determination of an abnormality in the timing belt 85 is performed every time the driving-side rotation member 91, which repeatedly rotates and stops, starts to rotate, but the determination of an abnormality in the timing belt 85 is not necessarily performed every time the driving-side rotation member 91 starts to rotate. The determination of an abnormality in the timing belt 85 may be performed when rotation and a stop of the driving-side rotation member 91 are repeated by a predetermined number of times, or the determination of an abnormality in the timing belt 85 may be performed at predetermined time intervals. For example, the determination of an abnormality in the timing belt 85 may be performed at a rate of once per 1000 times (cycles) with respect to the number of times when the driving-side rotation member 91 starts to rotate, or the determination of an abnormality in the timing belt 85 may be performed once in 24 hours. By leaving intervals in performing the determination of an abnormality in the timing belt 85, the load of the arithmetic processing in detecting an abnormality in the timing belt 85 can be reduced more securely.

The invention claimed is:

1. An injection molding machine comprising:
a timing belt wound around a driving-side rotation member and a driven-side rotation member and configured to transmit power from the driving-side rotation member to the driven-side rotation member;
a driving-side rotation detector configured to detect a rotational speed of the driving-side rotation member;
a driven-side rotation detector configured to detect a rotational speed of the driven-side rotation member; and
a hardware processor configured to detect an abnormality in the timing belt based on a relative speed difference between the rotational speed of the driving-side rotation member detected by the driving-side rotation detector and the rotational speed of the driven-side rotation member detected by the driven-side rotation detector in a predetermined period from when the driving-side rotation member starts to rotate from a stopped state, wherein
the hardware processor is configured not to continuously monitor whether the abnormality occurs, and is configured to monitor whether the abnormality occurs only during the predetermined period.

2. The injection molding machine according to claim 1, wherein the hardware processor is configured to calculate an integrated value of the relative speed difference in the predetermined period, and determine that an abnormality occurs in the timing belt in a case in which the integrated value of the relative speed difference is larger than a predetermined value.

3. The injection molding machine according to claim 1, wherein the hardware processor is configured to determine, as the predetermined period, a time from when a drive for rotating the driving-side rotation member starts to rotate from a stopped state until reaching a rotational speed set in advance.

4. The injection molding machine according to claim 1, wherein the hardware processor is configured to determine that an abnormality occurs in the timing belt in a case in which the relative speed difference is larger than a predetermined threshold, or in a case in which a difference is present between the rotational speed of the driving-side rotation member and the rotational speed of the driven-side rotation member even after a predetermined time has elapsed after the driving-side rotation member starts to rotate.

* * * * *